(12) United States Patent
Ohara et al.

(10) Patent No.: US 6,621,529 B2
(45) Date of Patent: Sep. 16, 2003

(54) COMMON COLOR WHEEL SPEED SYSTEM

(75) Inventors: Kazuhiro Ohara, Allen, TX (US); Adam J. Kunzman, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 411 days.

(21) Appl. No.: 09/745,906

(22) Filed: Dec. 21, 2000

(65) Prior Publication Data

US 2002/0003512 A1 Jan. 10, 2002

Related U.S. Application Data

(60) Provisional application No. 60/173,287, filed on Dec. 28, 1999.

(51) Int. Cl.⁷ .................................................. H04N 9/12
(52) U.S. Cl. ........................................ 348/743; 348/771
(58) Field of Search ................................. 348/742, 743, 348/771, 759, 760; 318/722, 807

(56) References Cited

U.S. PATENT DOCUMENTS

| | | | |
|---|---|---|---|
| 5,625,424 A | | 4/1997 | Conner et al. |
| 5,657,099 A | * | 8/1997 | Doherty et al. ............. 348/743 |
| 5,691,780 A | | 11/1997 | Marshall et al. |
| 5,774,196 A | | 6/1998 | Marshall |
| 5,880,573 A | | 3/1999 | Marshall et al. |
| 5,986,721 A | * | 11/1999 | Jones, Jr. et al. ........... 348/743 |
| 6,002,452 A | | 12/1999 | Morgan |
| 6,054,832 A | | 4/2000 | Kunzman et al. |
| 6,084,235 A | | 7/2000 | Breithaupt et al. |

* cited by examiner

Primary Examiner—Victor R. Kostak
(74) Attorney, Agent, or Firm—Charles A. Brill; Wade James Brady, III; Frederick J. Telecky, Jr.

(57) ABSTRACT

A display system 100 in which light from source (102) is focused onto a spinning color wheel (104). The spinning color wheel (104) creates of beam of light that changes from one primary color to the next in rapid sequence. The primary colored beam of light impinges a spatial light modulator (106), in this case a DMD. A controller (108) receives an input video signal and sends image data to the spatial light modulator (106) in synchronization with the color wheel (104)—image data representing the red portions of the image is sent during the period in which the red color filter is passing through the beam of light. The modulated red beam of light is focused onto an image plane (110) by projection lens (112) to form a red image. The process repeats as the green and blue filters pass through the path of the light beam. The eye of the viewer integrates the three primary color images giving the perception of a single full-color image. The display system uses a single nominal color wheel speed to display input signals having various frame rates. The nominal color wheel speed is selected to allow the same color wheel rate to be used for a variety of input frame rates. The color wheel speed is selected to provide a sub-frame rate that is an integer multiple the frame rate of each potential input format.

18 Claims, 1 Drawing Sheet

COMMON COLOR WHEEL SPEED SYSTEM

This application claims priority under 35 USC §119(e)(1) of provisional application number 60/173,287 filed Dec. 28, 1999.

FIELD OF THE INVENTION

This invention relates to the field of display systems, more particularly to sequential color display systems that use a white light source in combination with a sequential filter such as a color wheel to produce a full color image.

BACKGROUND OF THE INVENTION

Many projection display systems use a single light modulator in combination with a white light source to produce a full color image. In order to produce a full color image, the white light source is filtered sequentially to produce a primary colored light beam that changes over time. Typically, a color wheel is used to allow a series of primary colored filters to be spun through the white light beam in rapid succession. As each filter passes through the light beam, the light beam becomes a primary color beam with the active primary color determined by the which portion of the color wheel is passing through the optical path.

During each primary color period, data for the appropriate color is provided to a spatial light modulator to enable the modulator to create a series of single color images. If the single color images are created in a rapid sequence, the viewer's eye integrates the series of images to give the perception of viewing a single full-color image.

Because the data that must be written to the modulator depends on the position of the color wheel, the position of the color wheel is tightly controlled to synchronize the color wheel with the remainder of the display system. The transition period between adjacent color filters—typically called a spoke period—requires turning the modulator off to ensure only pure primary colored light is used to create each of the three primary colored image. Uncertainties and errors in the position or speed of the color wheel force the display system controller to lengthen the spoke periods to ensure only primary colored light is incident the modulator at the appropriate time. Unfortunately, the accumulated off time associated with the lengthened spoke periods creates a substantial drop in projector efficiency.

An additional problem arises when the display system is used to display one of many available video signals—for example off the air broadcasts or other consumer television applications. The various channels received by a display system may be broadcast at different frame rates. For example, in Hong Kong both PAL (50 Hz) and NTSC (60 Hz) broadcasts are available at the same time.

Cinematic source material creates a similar problem. Movies originally recorded on film typically were filmed at a 24 Hz frame rate. When a movie is broadcast on television, it is typically converted to a 60 Hz frame rate through a 3:2 frame rate conversion process. Display systems can detect the 3:2 frame rate conversion and reconvert the received signals to the original 24 Hz frame rate. Additionally, Modem ATV or HDTV broadcast standards allow for 24 Hz broadcast frame rates. While many display systems adapt to the 24 Hz frame rate, the frame rate can change abruptly when a commercial is broadcast. Likewise, the frame rate can change abruptly anytime a channel change occurs. The display system therefore must be very agile to adapt to the various frame rates that can be presented without warning.

Each time a signal changes, not only can the frame rate change, but the phase of the signal—alignment of the beginning of the frames—also changes. CRT-based displays handle these changes quite well, the new vertical retrace is detected and the new frame starts immediately while circuitry locks onto the new vertical and horizontal synchronization signals. Display systems that use color wheels, however, have a much more difficult time changing the frame rate and frame alignment. The speed of the color wheel must be altered to reposition of the color wheel relative to the received video signal. Because the color wheel has mass and is spinning relatively quickly, a high-torque motor is needed to make rapid speed and position changes. The high torque motor is expensive and can be noisy as it changes speed.

A method and system for controlling a color wheel with a low torque motor while providing a rapid response to frame rate and alignment changes is needed. The new method and system should reduce the time required to resynchronize with a new video signal, limit the noise generated by the color wheel, and be relatively inexpensive to implement.

SUMMARY OF THE INVENTION

Objects and advantages will be obvious, and will in part appear hereinafter and will be accomplished by the present invention which provides a method and system for a common color wheel speed system. According to one embodiment of the disclosed system, a display system is provided. The display system comprises a light source for producing a beam of white light along a first light path, a filter wheel on the first light path for filtering the beam of white light, the filter wheel having at least one set of primary colored filters thereon, a motor connected to the filter wheel for spinning the filter wheel at a nominal speed, a spatial light modulator on the first light path for receiving the filtered beam of light traveling along the first path and selectively modulating the filtered beam of light traveling along the first path to form an image, and a controller receiving an input video signal and providing image data decoded from the input video signal to the spatial light modulator, the input video signal having one of at least two formats and at least two nominal frame periods, the controller dividing the frame periods into sub-frames during which the image data is used by the spatial light modulator to form the image, the number of sub-frames dependent on the format of a received input video signal and the nominal speed of the color wheel.

According to one embodiment of the disclosed invention, the color wheel contains two sets of color filters and rotates at 150 Hz. NTSC signals are displayed using five sub-frames during the period in which the color wheel rotates 2.5 revolutions. PAL signals are displayed using six sub-frames during the period in which the color wheel rotates 3 revolutions. Alternate embodiments enable a common color wheel speed to be used for both film-based and NTSC formats.

According to one alternate embodiment, a nominal color wheel speed of 180 revolutions per second is used with a color wheel having two sets of filters. NTSC signals are displayed using six sub-frames during three rotations of the wheel. Film-based video signals, are displayed using fifteen sub-frames at a 24 Hz frame rate during 7.5 revolutions of the color wheel.

According to another alternate embodiment, a nominal color wheel speed of 120 revolutions per second is used with a color wheel having three sets of filters. NTSC signals are displayed using six sub-frames during two rotations of the wheel. Film-based video signals, are displayed using fifteen sub-frames at a 24 Hz frame rate during five revolutions of the color wheel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figures 1, 2, 3, 4:
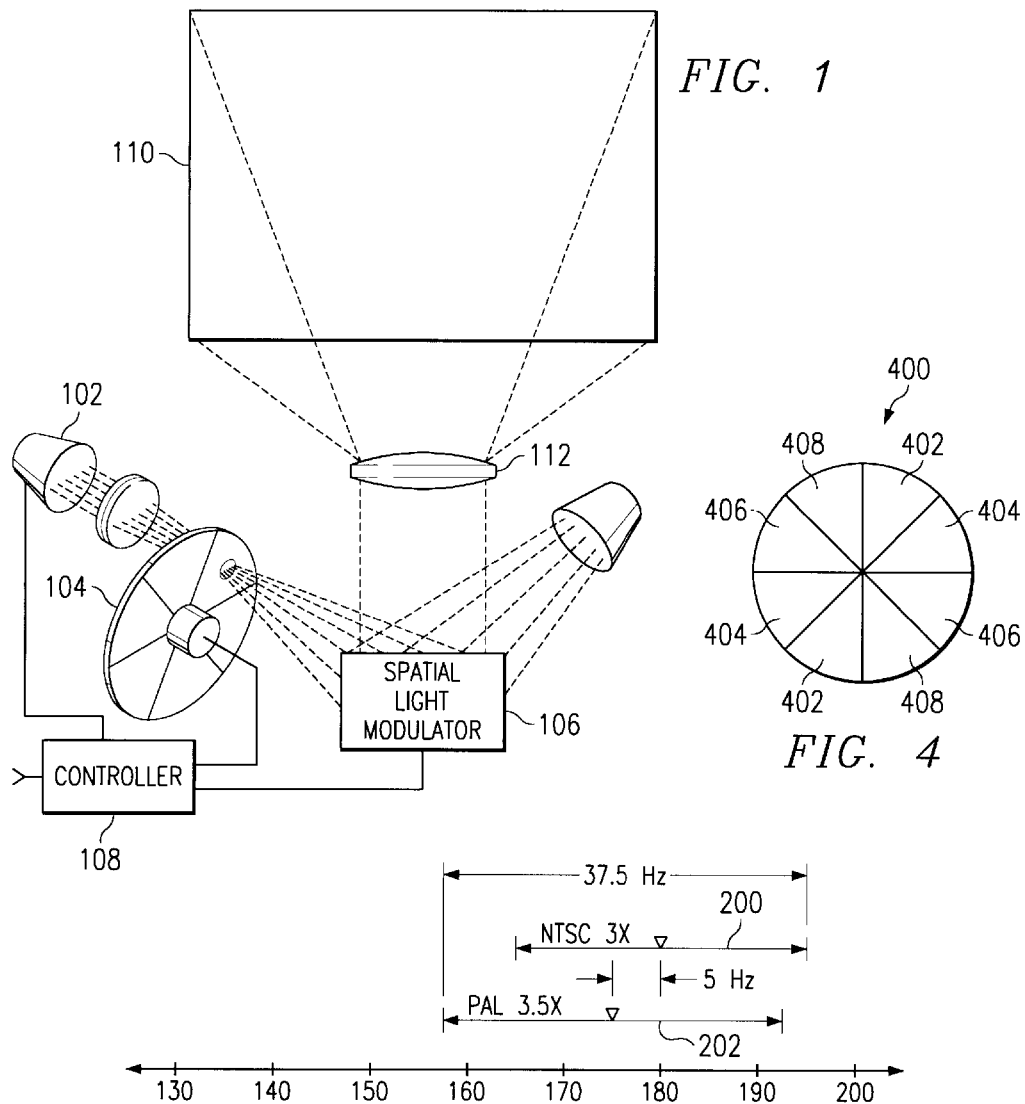
FIG. 1 is a schematic representation of a sequential color display system using the common color wheel speed system of the present invention.
FIG. 2 is a graph of the wheel speeds used in prior art display systems.
FIG. 3 is a graph of the wheel speed used by display systems according to the present invention.
FIG. 4 is a plan view of a color wheel suitable for use with the disclosed common color wheel speed system.

A new color wheel speed control method and system has been developed. The new system spins the color wheel at a common base rate regardless of the frame rate of the received video signal. The new method and system enable very rapid channel changes, even between video sources of different frame rates. By using a common color wheel speed, an inexpensive low torque motor is used reducing not only the cost of the display system but also the power required to operate the color wheel motor and the noise created by the color wheel motor. The common color wheel speed also simplifies the design of the control loops operating the color wheel.

FIG. 1 is a perspective view of a sequential color display system 100. In the display system 100 of FIG. 1, light from source 102 is focused onto a spinning color wheel 104. The spinning color wheel 104 creates of beam of light that changes from one primary color to the next in rapid sequence. The primary colored beam of light impinges a spatial light modulator 106, in this case a DMD.

A controller 108 receives a video signal and sends image data to the spatial light modulator 106 in synchronization with the color wheel 104. Image data representing the red portions of the image is sent during the period in which the red color filter is passing through the beam of light. The modulated red beam of light is focused onto an image plane 110 by projection lens 112 to form a red image. The process repeats as the green and blue filters pass through the path of the light beam. The eye of the viewer integrates the three primary color images giving the perception of a single full-color image.

In order to accomplish the synchronization between the color wheel 104 and the image data, the display system controller 108 provides the motor spinning the color wheel 104 with speed commands and receives positional information from the color wheel 104. As will be discussed in detail below, a novel feature of the display system of FIG. 1 is the use of a common nominal color wheel speed for multiple input video formats. The input video formats have different frame rates, which in the prior art necessitated changing the speed of the color wheel. According to the invention taught herein, the nominal color wheel speed is selected to allow the same color wheel rate to be used for a variety of input frame rates.

The color wheel speed multiplied by the number of complete filter sets on the color wheel determines the sub-frame rate of the display system. Dividing the sub-frame rate by the frame rate of a given input signal yields the number of sub-frames in each frame of input data—which should be an integer. Dividing the number of sub-frames in each frame of input data by the number of complete filter sets on the wheel gives the number of rotations of the color wheel during a input frame period.

In prior art systems, changing the input video source could require both a frequency and phase change in the color wheel. The frequency change most commonly occurred when the input source changed from a 24 Hz frame rate to a 60 Hz frame rate. As described above, the 24 Hz frame rate source material is often broadcast at the standard 60 Hz frame rate, but to improve the picture quality some display systems reconvert the video signals to the 24 Hz frame rate. Since video sources are all independent, there is a random phase relationship between any two sources and virtually every time the source is changed a phase change occurs.

As described above, sequential color display systems produce full color images by creating a sequence of primary colored images. Existing digital micromirror device (DMD™) based display systems provide a plurality of images of each primary color, or color sub-frames, during a given frame period. Using multiple color sub-frames avoids the creation of motion artifacts, called color separation artifacts, that can be generated when each frame is comprised of only a single sub-frame of each primary color. Most people cannot see the color separation artifacts when the number of sub-frames of each primary color per frame exceeds about 4.5.

To generate the color sub-frames, a color wheel with a single set of color filters can be spun at a rate several times higher than the frame rate, or multiple sets of color filters can be put on the same color wheel. The faster the color wheel spins, the more noise is created by the movement of the wheel through the air and the faster the bearings of the color wheel wear out. A good compromise uses the color wheel shown in FIG. 4.

The color wheel 400 of FIG. 4 includes two complete sets of color filters. Each set of filters includes a red 402, green 404, blue 406, and clear 408 filter segment. The clear segment 408 is used to boost the brightness of the display. The segments do not have to be the same size, and typically the clear segment 408 is smaller than the other segments to avoid washing out the image.

Because the color wheel of FIG. 4 contains two complete sets of color filters, it can be rotated in increments of one-half revolution each frame. FIG. 2 is a graph showing the range over which the color wheel must operate in order to display NTSC and PAL broadcast signals. As shown in FIG. 2, operating the color wheel at three times the frame rate of an NTSC signal results in a nominal color wheel speed of 180 Hz. Since the color wheel has two sets of color filters, the effective sub-frame rate is 6× the actual frame rate. The band of speeds indicated as the NTSC range 200 shows the range over which the color wheel must be able to operate. The range of speeds allows for non-standard frame rates often generated by videotape recorders and allows the color wheel control circuitry to alter the speed of the color wheel to establish, or re-establish, phase lock between the color wheel and a video signal.

A second range 202 of frequencies shown on FIG. 2 indicates the range over which the color wheel must operate when the display system is receiving a PAL format broadcast signal. When receiving a PAL signal, the color wheel is spun at a rate 3.5 times the frame rate. This color wheel speed results in an effective sub-frame rate of 7× the actual frame rate.

Table 1 lists several operational modes and the speeds at which the color wheel rotates when displaying a given signal. Because there are many computer graphics standards, the graphics mode has a wide range of operating speeds. When displaying graphics, however, it is unlikely for the display system to be rapidly changed from one video source to another. Therefore the graphics mode largely can be ignored for the purposes of this disclosure.

TABLE 1

Common Video Standards and Color Wheel Speeds

| MODE | FRAME RATE | MULTIPLIER | WHEEL SPEED |
| --- | --- | --- | --- |
| FILM | 24 Hz | 7X | 168 Hz |
| PROSCAN | 30 Hz | 6X | 180 Hz |
| PAL | 50 Hz | 3.5X | 175 Hz |
| NTSC | 60 Hz | 3X | 180 Hz |
| GRAPHICS | 45–75 Hz | 2X | 90–150 Hz |

In some areas of the world, both PAL and NTSC broadcasts are available. In these areas, a simple channel change would require the display system of FIG. 2 to change between the 3× and 3.5× modes, as well as change the nominal color wheel rate by 5 Hz. The phase lock can be simulated by using buffer memory to delay a frame until the beginning of the next set of color wheel filters—which occurs twice every revolution. One the video is being displayed, the actual phase alignment can be performed very slowly if necessary.

The frequency lock required after changing between PAL and NTSC is not nearly as easy to perform. With a small motor, re-establishing frequency lock can take a couple of seconds. While this may not seem like a long time, even this short of delay is unacceptable when the display is used to jump between a large number of channels—often called "channel surfing."

FIG. 3 is a graph showing the limited range over which the color wheel must operate according to the disclosed invention. The primary feature of the new common color wheel motor control system is the use of a single center frequency for both the NTSC and PAL broadcasts. As shown in FIG. 3, the color wheel nominally operates at 150 Hz regardless of the format of the video signal being displayed. NTSC signals have an effective sub-frame rate of 5× while PAL signals have an effective sub-frame rate of 6×—both above the 4.5× rate at which most people can no longer detect color separation artifacts. The common color wheel frequency completely eliminates the frequency re-lock required by color wheel systems of the prior art when changing between PAL and NTSC broadcasts.

The range of frequencies used by the color wheel controller shown in FIG. 3 is also lower than the range used in FIG. 2. The lower color wheel speed results in less wind noise is generated by spinning the color wheel and also increases the life of the color wheel bearings. The overall operating range of the new color wheel control system is narrower than the prior systems. The narrower range can potentially reduce the cost of the control circuitry and also requires fewer sequence codes to implement pulse width modulation over the entire allowable range of frame rates.

In areas in which the transition between PAL and NTSC formats is not a concern, the disclosed invention is still useful to provide a common color wheel speed at which both film and NTSC broadcast material can be displayed. The transition between the film frame rate of 24 Hz and the standard NTSC frame rate of 60 Hz can occur whenever the display system video source is changed as well as whenever a given source cuts from a movie to a commercial.

One solution providing a common color wheel speed used to project both film and NTSC media is to use a 180 Hz color wheel rate and a color wheel having two sets of color filters. The wheel spins 7.5 times for each frame of film data, and 3 times for each frame of NTSC data, for an effective sub-frame rate between 6 and 15. The wheel could be slowed down to 120 Hz by adding a third set of color filters to the wheel and spinning the wheel 5 times each film frame or 2 times each NTSC frame.

Transitions between films and PAL formats are more difficult since the 24 Hz film frame rate is not easily translated to the 50 Hz PAL frame rate. The PAL frame rate, however, is so close to twice the film frame rate that there is little benefit to locking the color wheel to a common speed since the color wheel can drift the 2 Hz between the two when necessary.

Thus, although there has been disclosed to this point a particular embodiment for a common color wheel speed system and method, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A display system comprising:
   a light source for producing a beam of white light along a first light path;
   a filter wheel on said first light path for filtering said beam of white light, said filter wheel having at least one set of primary colored filters thereon;
   a motor connected to said filter wheel for spinning said filter wheel at a nominal speed;
   a spatial light modulator on said first light path for receiving said filtered beam of light traveling along said first path and selectively modulating said filtered beam of light traveling along said first path to form an image; and
   a controller receiving an input video signal and providing image data decoded from said input video signal to said spatial light modulator, said input video signal having one of at least two formats, said at least two formats having at least two nominal frame periods, said controller dividing said frame periods into sub-frames during which said image data is used by said spatial light modulator to form said image, the number of sub-frames dependent on the format of a received input video signal and the nominal speed of said color wheel.

2. The display system of claim 1, said nominal speed being 150 revolutions per second.

3. The display system of claim 1, said filter wheel having two sets of filters.

4. The display system of claim 1, said controller operable to receive an NTSC input video signal and divide said NTSC video signal into five sub-frames.

5. The display system of claim 4, said color wheel rotating 2.5 revolutions during a period in which said five sub-frames are displayed.

6. The display system of claim 1, said controller operable to receive a PAL input video signal and divide said PAL video signal into six sub-frames.

7. The display system of claim 6, said color wheel rotating three revolutions during a period in which said six sub-frames are displayed.

8. The display system of claim 1, said nominal speed being 180 revolutions per second.

9. The display system of claim 1, said controller operable to receive an NTSC input video signal and divide said NTSC video signal into six sub-frames.

10. The display system of claim 9, said color wheel rotating three revolutions during a period in which said six sub-frames are displayed.

11. The display system of claim 1, said controller operable to receive an input video signal representing a 24 Hz image source, and divide said 24 Hz input video source into fifteen sub-frames.

12. The display system of claim 11, said color wheel rotating 7.5 revolutions during a period in which said fifteen sub-frames are displayed.

13. The display system of claim 1, said nominal speed being 120 revolutions per second.

14. The display system of claim 13, said controller operable to receive an NTSC input video signal and divide said NTSC video signal into six sub-frames.

15. The display system of claim 14, said color wheel rotating two revolutions during a period in which said five sub-frames are displayed.

16. The display system of claim 13 said controller operable to receive an input video signal representing a 24 Hz image source, and divide said 24 Hz input video source into fifteen sub-frames.

17. The display system of claim 16, said color wheel rotating five revolutions during a period in which said fifteen sub-frames are displayed.

18. The display system of claim 1, said filter wheel having three sets of filters.

* * * * *